United States Patent [19]

Freese

[11] E Re. 28,695

[45] Reissued Jan. 27, 1976

[54] MASTER CYLINDER CONSTRUCTION AFFORDING AUTOMATIC RE-PHASING OF MASTER AND SLAVECYLINDERS

[75] Inventor: Evans Glenn Freese, Hutchinson, Kans.

[73] Assignee: The Cessna Aircraft Company, Wichita, Kans.

[22] Filed: Sept. 9, 1974

[21] Appl. No.: 504,179

Related U.S. Patent Documents

Reissue of:

[64] Patent No.: 3,347,043
Issued: Oct. 17, 1967
Appl. No.: 509,113
Filed: Nov. 22, 1965

[52] U.S. Cl. ..... 60/546; 60/592; 92/61; 92/162; 92/163

[51] Int. Cl.[2] ..... F15B 7/00

[58] Field of Search ..... 60/533, 546, 535, 543, 60/542, 544, 591, 592; 91/393, 443; 92/61, 162, 163; 417/386

[56] References Cited

UNITED STATES PATENTS

| | | | |
|---|---|---|---|
| 670,447 | 3/1901 | Fulton et al. | 60/543 |
| 2,312,337 | 3/1943 | Hughes | 417/386 |
| 2,539,720 | 1/1951 | Bender | 60/543 |
| 2,591,793 | 4/1952 | Dubois et al. | 60/590 |
| 2,766,590 | 10/1956 | Erwin et al. | 60/543 |
| 2,882,685 | 4/1959 | Carlsen et al. | 60/375 |
| 2,997,849 | 8/1961 | Shimanckas | 60/572 |
| 3,253,515 | 5/1966 | Wilkinson | 91/401 |
| 3,347,043 | 10/1967 | Freese | 60/546 |
| 3,832,852 | 9/1974 | Schmucker | 60/546 |

FOREIGN PATENTS OR APPLICATIONS

| | | | |
|---|---|---|---|
| 547,650 | 9/1942 | United Kingdom | 60/546 |

*Primary Examiner*—Martin P. Schwadron
*Assistant Examiner*—H. Burks, Sr.

EXEMPLARY CLAIM

6. A hydraulic actuator assembly comprising:
an elongated cylinder;
first and second longitudinally spaced fluid inlet and outlet fittings in the cylinder wall;
first and second longitudinally spaced fluid inlet and outlet ports through the cylinder wall communicating respectively with the first and second inlet and outlet fittings;
first and second longitudinally spaced fluid escape orifices through the cylinder wall communicating respectively with the first and second inlet and outlet fittings, one orifice adjacent each of said ports, the longitudinal spacing between the orifices being less than the longitudinal spacing between said ports, and the fittings, ports and orifices being in substantial longitudinal alignment along the cylinder wall;
a piston having limited reciprocable movement in the cylinder; and
an annular seal or packing carried by the piston for sealing between the piston and the internal wall of the cylinder, and for thus dividing the cylinder into first and second fluid pressure chambers,
the location of the piston at each end of its permitted stroke and the spacing between and location of the ports and the orifices being so related, each to the other, that:
a. when the piston is at one end of its stroke the piston seal is located between the first port and the adjacent first orifice, the first cylinder chamber is in open communication with the first fitting through the first port, and the second cylinder chamber is in restricted communication with the first fitting through said first orifice; and
b. when the piston is at the other end of its permitted stroke the piston seal is located between the second port and the adjacent second orifice, the second cylinder chamber is in open communication with the second fitting through the second port, and the first cylinder chamber is in restricted communication with the second fitting through the second orifice.

6 Claims, 3 Drawing Figures

EVANS GLENN FREESE
INVENTOR.

BY Herbert Miller

ATTORNEY

EVANS GLENN FREESE
INVENTOR.

BY Hubert Miller

ATTORNEY

MASTER CYLINDER CONSTRUCTION AFFORDING AUTOMATIC RE-PHASING OF MASTER AND SLAVECYLINDERS

Matter enclosed in heavy brackets [ ] appears in the original patent but forms no part of this reissue specification; matter printed in italics indicates the additions made by reissue.

This invention relates to a unique construction for a master hydraulic cylinder of the type capable of performing useful work while simultaneously controlling the coordinated operation of associated slave cylinders, which also perform useful work. The cylinder construction is also capable of use in a hydraulic system in which it performs its work independent of any slave cylinder association or operation.

A master cylinder construction embodying my invention is illustrated and described herein associated with a single slave cylinder. In such a combination, where both master and slave cylinders are simultaneously performing useful work at widely separated locations, it is often required that the pistons and rods of the two cylinders start their movement simultaneously, travel at substantially the same velocity, travel the same distance, and reach the ends of their respective strokes at substantially the same time. This is true, for instance, when two such cylinders are connected to raise and lower the respective opposite ends of the reel on a combine or other harvester. Such coordinated action of the cylinders is required in order to maintain the elongated reel in a level position throughout the raising and lowering operation.

The difficulty of maintaining such coordinated action over an extended period of weeks is primarily due to uneven wear of the working parts of the two working cylinders, particularly the hydraulic fluid seals. Seal wear causes leakage, and due to this leakage the piston and rod of one cylinder may not complete its travel to the full end of its permitted stroke in either direction, resulting in a progressive shortening of the length of its stroke. In other words the pistons and rods of the two cylinders get out of phase.

It is a primary object of my invention to provide a master cylinder construction which automatically re-phases the piston positions of the master cylinder and the associated slave cylinder or cylinders at each end of their respective strokes, regardless of the relative degree of wear on the working parts of the respective associated cylinders over an extended period. By so re-phasing the positions of the respective pistons at each end of their respective strokes, assurance is provided that all pistons begin their return strokes simultaneously, and that all pistons travel to the full ends of their respective permitted strokes in each direction.

Another important object of the invention is to provide a master cylinder construction which automatically provides a relief against over pressurization of one cylinder due to the fact that the piston of that cylinder reaches the end of its permitted stroke prior to the time the piston of an associated cylinder reaches the end of its permitted stroke.

Another object is to provide a master cylinder construction which accomplishes the above described results without the use of poppet valves, manual valves, etc., which are commonly used to accomplish re-phasing of associated working cylinders, whether they are connected in series or in parallel.

An additional object of the invention is to provide a double acting working cylinder construction which provides relief against internal over pressurization of the cylinder at both ends of the piston stroke in case the control valve directing pressure fluid to either end of the cylinder is not closed just prior to or at approximately the instant the piston reaches the end of its stroke in either direction.

The invention will be more clearly understood when the following description is read in connection with the accompanying drawings, in which.

Figure 1:
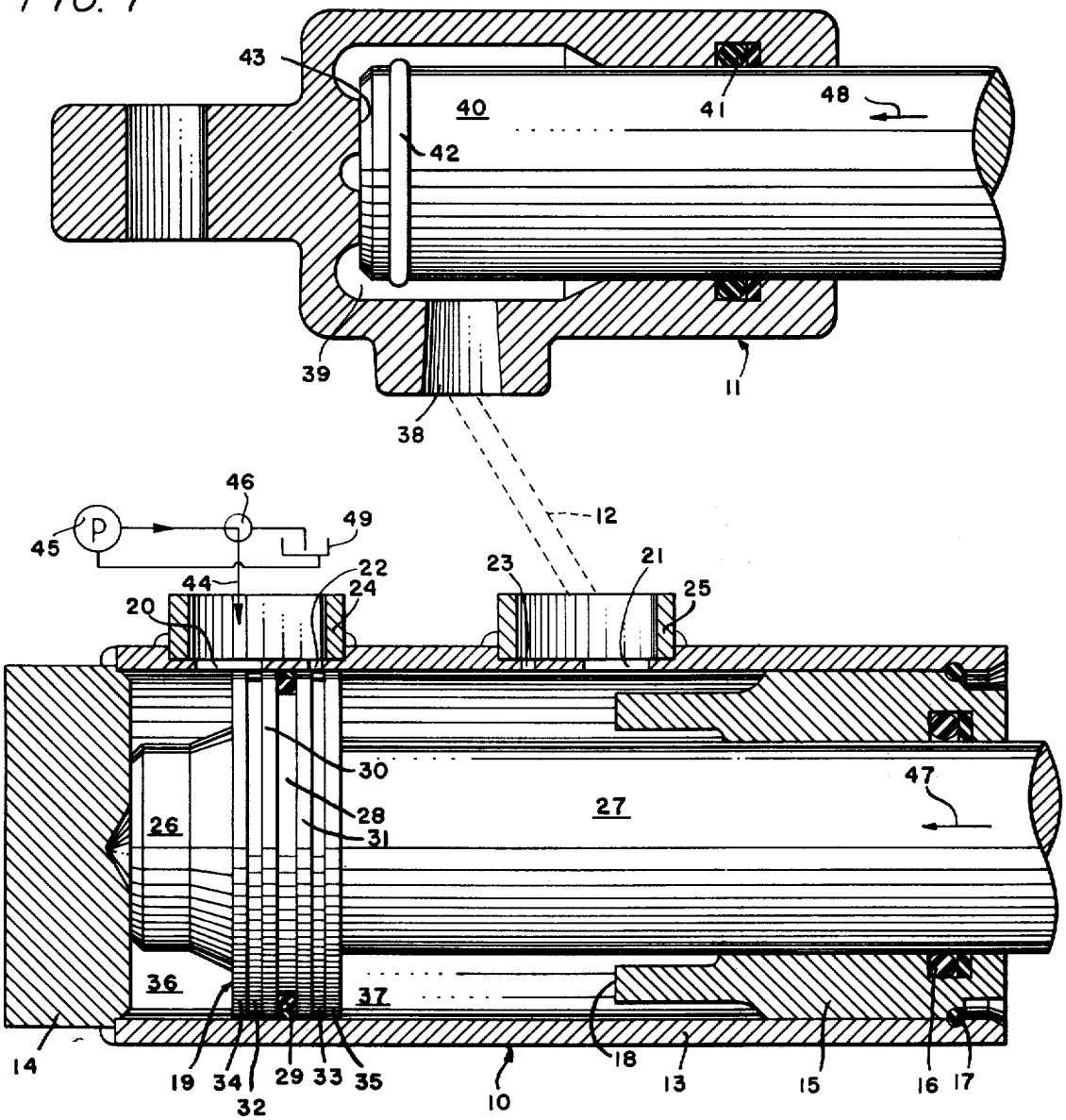
FIG. 1 is a central longitudinal sectional view through a hydraulic working cylinder embodying my invention, shown connected in series to an associated hydraulic slave cylinder, the hydraulic system for actuating both cylinders being shown schematically, the respective pistons and rods of both cylinders being shown at the inner ends of their permitted strokes.

A cylinder construction which embodies my invention is shown in the lowr portion of FIG. 1, and is designated as a whole by the numeral 10. For clarity in description cylinder 10 is shown connected in series to a slave cylinder 11 by means of a conduit 12. Cylinder 10 will be referred to herein as a master cylinder, although it should be understood that this cylinder may be used in any hydraulic system as a double acting working cylinder, completely disassociated from any slave cylinder.

Figure 2:
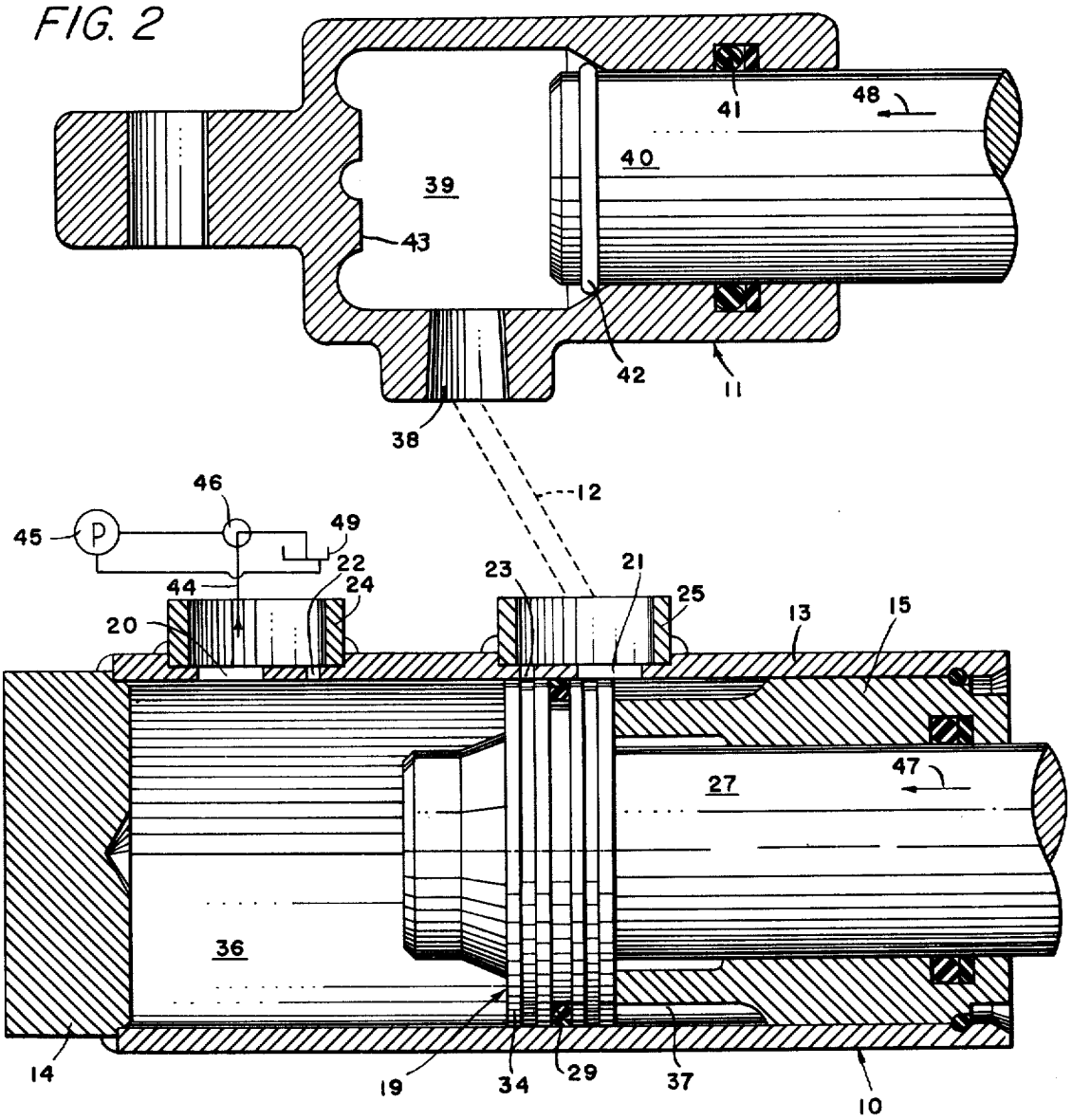
FIG. 2 is a view similar to FIG. 1, with the respective pistons and rods of both cylinders being shown at the outer ends of their permitted strokes.

Construction—FIGS. 1 and 2

Referring to FIG. 1, master cylinder 10 includes a barrel 13 having a fixed head 14 at one of its ends and a removable piston rod bearing 15 at its other end. Bearing 15 carries seals 16 and 17. The head 14 and the inner end 18 of bearing 15 serve as travel limit stops for a piston 19.

Barrel 13 is provided with relatively large longitudinally spaced ports 20 and 21, and a pair of respectively associated fluid escape orifices 22 and 23. Port 20 and orifice 22 both communicate with a conduit attachment fitting 24, while port 21 and orifice 23 both communicate with a similar conduit fitting 25.

Piston 19 carries an integral stop 26, and is connected to a reciprocable rod 27. Piston 19 is provided with a central annular groove 28 which seats an annular wall seal 29, adjacent annular lands 30 and 31 which are of a diameter to fit the barrel wall snugly, grooves 32 and 33, and outside lands 34 and 35. Piston 19, of course, divides the interior of barrel 13 into two pressure fluid chambers 36 and 37.

The length of permitted travel of piston 19 between stops 14 and 18, and the relative locations of ports 20 and 21 and orifices 22 and 23 with respect to the location of seal 29 on the piston are such that when piston 19 is at the inner end of its stroke, as in FIG. 1, port 20 is located between seal 29 and head 14 and openly communicates with chamber 36. With the piston in this position orifice 22 is located between seal 29 and :hamber 37, and if the fluid pressure in chamber 37 is ;reater than the pressure in chamber 36 and fitting 24, luid from chamber 37 may leak past land 35 and es- :ape through orifice 22 into fitting 24. Any flow of fluid hrough escape orifice 22 in the opposite direction due o a higher pressure in fitting 24 than in chamber 37, is ıcidental and immaterial in the illustrated series hook- p of master and slave cylinder, because the least out- /ard movement of piston 19 causes seal 29 to pass rifice 22, thus cutting off the fluid escape route into hamber 37.

In the same manner, when piston 19 is located at the uter end of its permitted stroke, as in FIG. 2, port 21 ; located outside seal 29 and openly communicates 'ith chamber 37. At the same time escape orifice 23 is ɔcated inside seal 29. If fluid pressure in chamber 36 is igher than in fitting 25 and chamber 37, fluid can leak ast land 34, through orifice 23 and into fitting 25. eakage of fluid through orifice 23 in the opposite irection, due to the existence of a higher pressure in tting 25 than in chamber 36, is inconsequential.

In the hydraulic system illustrated, master cylinder tting 25 is connected by conduit 12 to a port 38 in a 'all of single acting slave cylinder 11. Port 38 commu- icates with a pressure chamber 39, within which a ɔmbination piston and rod 40 is reciprocable. The hambers 37 and 39 have equal volume capacities, :gardless of the permitted length of stroke of the pis- ɔn rods 27 and 40. A piston rod seal 41 normally revents leakage from slave cylinder chamber 39 as the ɔd reciprocates. A snap ring 42 is seated in an annular roove near the inner end of rod 40, and serves as a op to limit outward movement of the rod in its cylin- er. Inward movement of rod 40 is limited by contact f the inner end of the rod with an inwardly projecting ɔutment 43, integral with the cylinder end wall.

Operation

With both pistons 27 and 40 positioned at the inner ıds of their respective strokes, as in FIG. 1, and with ıe chambers 36, 37 and 39, and conduits 12 and 44 ɔmpletely filled, fluid under pressure is delivered from pump 45 or other source, through conduit 44 and ɔrt 20 into master cylinder chamber 36, when a con- ol valve 46 is properly adjusted. The instant piston 19 arts to move outward, fluid is forced from chamber 7 through conduit 12 and into slave chamber 39, and ston 40 simultaneously starts to move outward. It will : assumed that both piston rods are operating against ad forces applied in the directions indicated by the 'rows 47 and 48.

Case No. 1—Extension

Assuming that there is fluid leakage from slave cham- :r 39 past seal 41 due to a worn seal or because of a 'eater load on piston rod 40, rod 40 would normally op traveling before reaching the outer end of its roke, while master piston 19 would continue to travel the full end of its stroke. This could occur because of sufficient fluid in master chamber 37 to completely l slave chamber 39 after fluid had leaked from that ıamber (FIG. 2).

Under this condition supplemental fluid under pres- re from source 45 would leak past land 34 (FIG. 2), rough orifice 23, through conduit 12 and into slave ıamber 39, thus forcing piston 40 to the full outer end its stroke, regardless of leakage from chamber 39. ıe pistons and rods of both master and slave cylinders are thus re-phased at the outer ends of their respective strokes, each time the movement cycle is repeated.

Case No. 2—Retraction

With both pistons at the outer ends of their respective strokes, as in FIG. 2, control valve 46 can be adjusted to its FIG. 2 condition, which connects master chamber 36 to a system reservoir 49, and allows both pistons to simultaneously start their inward travel under the influence of their respective loads.

If master piston 19 reaches the full end of its permitted inward travel before slave piston 40 does, excess fluid can pass from chamber 39 (FIG. 1) through chamber 37, past land 35, and through escape orifice 22 into conduit 44 and to the reservoir, thus permitting piston 40 to travel to the full inner end of its stroke.

If slave cylinder piston 40 reaches the inner end of its stroke before master piston 19 has completed its stroke, and a void is created in chamber 37 as piston 19 continues to the end of its stroke, that void is filled through escape orifice 22 by pressure fluid from the pump before either piston again starts its outward travel during the next cycle. The pistons and rods of the two cylinders are thus re-phased at each of the ends of their respective strokes.

Figure 3:
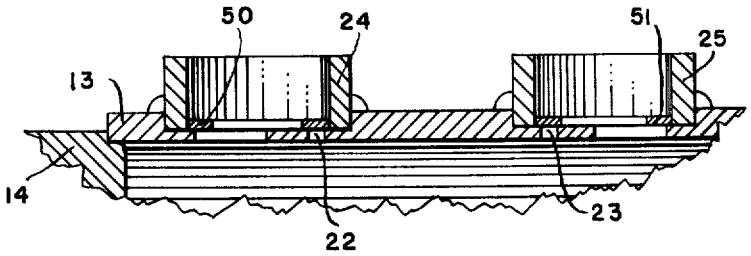
FIG. 3 is a fragmentary view of a portion of the cylinder shown in the lower part of FIG. 2, and includes optional check valves which are not included in the other drawing figures, yet which constitute a part of my invention.

FIG. 3 Construction

The construction shown in FIG. 3 differs from the previously described master cylinder construction only by the inclusion of flat washers 50 and 51, of metal or other material, which seat in conduit fittings 24 and 25, and act as check valves to prevent the flow of fluid in one direction through escape orifices 22 and 23, respectively.

Operation—FIG. 3

The washer type check valves 50 and 51 are useful in preventing uneven extension or retraction of the two piston rods 27 and 40 in case rod 27 is loaded much more heavily than rod 40.

Under such a condition, with both pistons at the inner ends of their respective strokes as in FIG. 1, check valve 50 prevents pressure fluid from traveling through escape orifice 22, chamber 37, and to slave chamber 39, and moving piston 40 outward while master piston 27 remains stationary under its heavier load.

With both pistons at the outer ends of their respective strokes, with piston rod 40 loaded much higher than master rod 27, and with control valve 46 open only slightly to provide slow inward movement of the pistons, check valve 51 prevents fluid from being forced from slave cylinder chamber 39 through escape orifice 23 and conduit 44 to reservoir. Rod 40 is thus prevented from moving inward in its cylinder under its greater load, while the pressure build up in master chamber 36 temporarily prevents rod 27 from moving inward under its lighter load. Uneven retraction or extension of the unequally loaded piston rods is thus prevented.

It will be understood from the above description of the master cylinder construction that a number of master cylinders could be connected in series, and that the first master would extend and retract the pistons of all the cylinders in unison. By varying cylinder capacities the the rate and extent of rod movement in the various cylinders can also be varied to meet requirements. It will also be understood that the fluid escape orifices 22 and 23 in each master cylinder of the series would accomplish rephasing of all pistons at each end of their respective strokes.

Having described the invention with sufficient clarity to enable those familiar with this art to construct and use it, I claim:

[1. A hydraulic actuator assembly comprising:

an elongated cylinder;

a piston having limited reciprocable movement within the cylinder, and dividing the cylinder into first and second chambers;

a first port through a wall of the cylinder affording open exterior fluid communication with said first chamber regardless of piston position in the cylinder;

a first fluid escape orifice through a wall of the cylinder located to afford restricted exterior communication with the second chamber only when the piston is at one end of its permitted stroke;

a second port through a wall of the cylinder affording open exterior communication with said second chamber regardless of piston position in the cylinder; and a second fluid escape orifice through a wall of the cylinder located to afford restricted exterior communication with the first chamber only when the piston is at the other end of its permitted stroke.]

[2. The actuator described in claim 1, and:

fluid conducting means affording communication exterior of the cylinder between each of said ports and the respectively adjacent fluid escape orifice.]

[3. The actuator described in claim 1, and:

a check valve for each of said escape orifices affording flow of fluid outward only through the respective orifices]

[4. In a hydraulic actuator which includes an elongated cylinder and a piston having limited reciprocatory movement therein, and which divides the cylinder into first and second chambers, said cylinder including separate means for conducting fluid into and from the respective chambers, the improvement in such an actuator which comprises:

a first fluid escape orifice through a wall of the cylinder located to afford restricted egress of fluid from said second chamber when the piston has moved to a position to reduce the first chamber to minimum volume capacity; and a second fluid escape orifice through a wall of the cylinder located to afford restricted egress of fluid from said first chamber when the piston has moved to a position to reduce said second chamber to minimum volume capacity.]

[5. The actuator described in claim 4, and:

a check valve for each of said escape orifices affording flow of fluid outward only through the respective orifices.]

6. A hydraulic actuator assembly comprising:

an elongated cylinder;

first and second longitudinally spaced fluid inlet and outlet fittings in the cylinder wall;

first and second longitudinally spaced fluid inlet and outlet ports through the cylinder wall communicating respectively with the first and second inlet and outlet fittings;

first and second longitudinally spaced fluid escape orifices through the cylinder wall communicating respectively with the first and second inlet and outlet fittings, one orifice adjacent each of said ports, the longitudinal spacing between the orifices being less than the longitudinal spacing between said ports, and the fittings, ports and orifices being in substantial longitudinal alignment along the cylinder wall;

a piston having limited reciprocable movement in the cylinder; and an annular seal or packing carried by the piston for sealing between the piston and the internal wall of the cylinder, and for thus dividing the cylinder into first and second fluid pressure chambers, the location of the piston at each end of its permitted stroke and the spacing between and location of the ports and the orifices being so related, each to the other, that:

(a) when the piston is at one end of its stroke the piston seal is located between the first port and the adjacent first orifice, the first cylinder chamber is in open communication with the first fitting through the first port, and the second cylinder chamber is in restricted communication with the first fitting through said first orifice; and (b) when the piston is at the other end of its permitted stroke the piston seal is located between the second port and the adjacent second orifice, the second cylinder chamber is in open communication with the second fitting through the second port, and the first cylinder chamber is in restricted communication with the second fitting through the second orifice.

*7. The actuator described in claim 6, wherein the inlet and outlet fittings have an inside diameter overlapping its associated port and escape orifice which are in fluid communication.*

*8. The actuator described in claim 6 wherein the inlet and outlet fittings each comprise a cylindrical sleeve having an inside diameter overlapping its associated port and escape orifice which are in fluid communication.*

*9. The actuator described in claim 6 wherein the inlet and outlet fittings each comprise a cylindrical sleeve welded to the cylinder wall having an inside diameter overlapping its associated port and escape orifice which are in fluid communication.*

*10. The actuator described in claim 6, wherein the escape orifices are of a diameter less than the width of the annular seal.*

*11. The actuator described in claim 6, wherein the distance between each of said ports and its associated escape orifice is greater than the width of the annular seal.*

* * * * *